United States Patent
Matsumaru

(12) 
(10) Patent No.: US 6,356,417 B1
(45) Date of Patent: Mar. 12, 2002

(54) ROTARY HEAD DRUM DEVICE

(75) Inventor: Masahiro Matsumaru, Abiko (JP)

(73) Assignee: Victor Company of Japan, Ltd., Kanagawa-Ku (JP)

( * ) Notice: Subject to any disclaimer, the term of this patent is extended or adjusted under 35 U.S.C. 154(b) by 0 days.

(21) Appl. No.: 09/617,532

(22) Filed: Jul. 14, 2000

(30) Foreign Application Priority Data

Sep. 20, 1999 (JP) ............................................. 11-264810

(51) Int. Cl.$^7$ ................................................. G11B 5/53
(52) U.S. Cl. ..................................................... 360/271.5
(58) Field of Search ...................................... 360/271.5

(56) References Cited

U.S. PATENT DOCUMENTS 5,402,291 A * 3/1995 Sasaya ........................ 360/107

* cited by examiner

Primary Examiner—Robert S. Tupper
(74) Attorney, Agent, or Firm—Louis Woo

(57) ABSTRACT

A rotary head drum device includes a rotary drum and a plurality of rotary heads mounted on the rotary drum. The rotary heads record and reproduce a signal on and from a magnetic tape. The rotary heads are as follows. First and second rotary heads for an information signal in a low-frequency range are opposed to each other diametrically with respect to the rotary drum, and are different from each other in azimuth angle. A third rotary head is designed for digital signals in frequency ranges higher than the frequency range of the information signal, and for first and second operation modes being different from each other in data transmission rate. A fourth rotary head for a digital signal in the second operation mode is opposed to the third rotary head diametrically with respect to the rotary drum, and is equal in azimuth angle to the third rotary head. A fifth rotary head for a digital signal in the first operation mode is substantially opposed to the third rotary head diametrically with respect to the rotary drum, and is different from the third rotary head in azimuth angle. The fourth and fifth rotary heads are in a double azimuth head structure. Sixth and seventh rotary heads for a digital signal in the second operation mode are opposed to each other diametrically with respect to the rotary drum, and are equal to each other in azimuth angle.

5 Claims, 4 Drawing Sheets

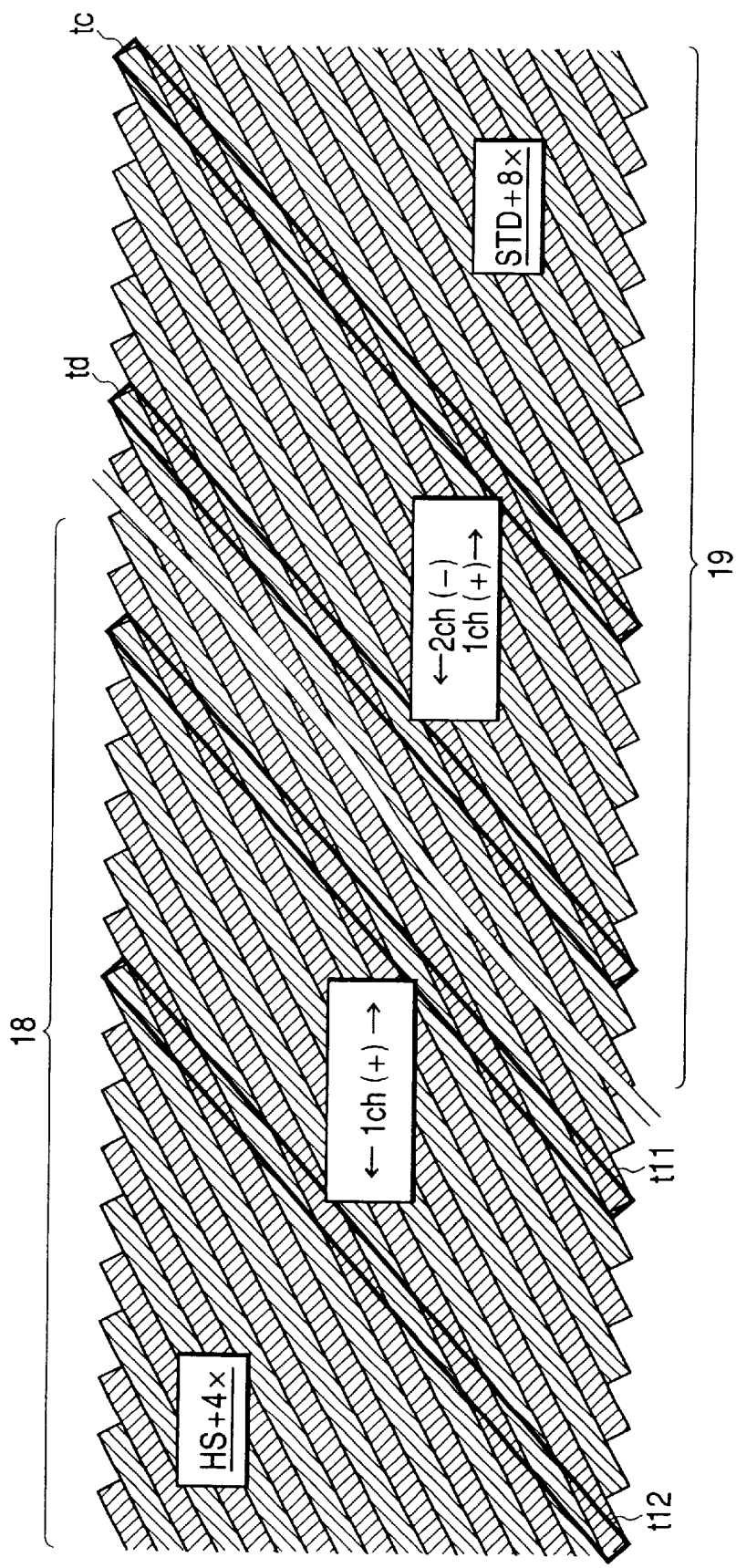

ROTARY HEAD DRUM DEVICE

BACKGROUND OF THE INVENTION

1. Field of the Invention

This invention generally relates to a rotary head drum device. This invention particularly relates to a rotary head drum device for apparatuses such as a video tape recorder and a data streamer.

2. Description of the Related Art

In a prior-art recording and reproducing apparatus such as a data streamer or a video tape recorder of a helical scan type, a plurality of rotary heads are mounted on the outer circumferential surface of a rotary drum at predetermined angular intervals, and a magnetic tape (a recording medium) is wrapped on the outer circumferential surface of the rotary drum in a prescribed angular range along a part of helix. During operation of the prior-art apparatus, the magnetic tape is fed relative to the rotary drum in a given direction, and is scanned by the rotary heads. Specifically, during a recording mode of operation of the prior-art apparatus, the rotary heads record an information signal on the magnetic tape while forming slant recording tracks thereon. During a playback mode of operation of the prior-art apparatus, the rotary heads reproduce the information signal from the recording tracks on the magnetic tape.

It is known to design and arrange the rotary heads so as to differentiate azimuth angles of adjacent recording tracks on the magnetic tape. In this case, it is unnecessary to provide guard bands between recording tracks. The absence of guard bands enables the magnetic tape to be efficiently used in the recording of an information signal.

Some of such helical-scan recording and reproducing apparatuses for guard-band-less recording are designed to be operable in any one of many different modes and to be compatible with another recording and reproducing system. These apparatuses tend to have an increased number of rotary heads on a rotary drum.

There is a physical limitation on the number of rotary heads which can be mounted on a rotary drum. In view of this limitation, advanced rotary head drum devices have been developed. For example, Japanese published unexamined patent applications 5-28445, 7-98827, 7-220252, and 8-124130 disclose rotary head drum devices having a quadruple head structure in which four rotary heads are provided in one window in a rotary drum, and are arranged at respective different phases with respect to the direction of rotation of the rotary drum.

Some rotary head drum devices include double azimuth heads referred to as DA heads. The DA head has two head cores which are provided in one window in a rotary drum, and which are connected with a common support on the rotary drum. For example, Japanese published unexamined patent applications 5-128452, 8-297823, 9-161247, and 11-161925 relate to head shapes, crosstalk, inter-core distances, and head-touch states in DA-head structures.

There are known rotary head drum devices including pair heads. The pair head has two head cores which are provided in one window in a rotary drum, and which are supported independently of each other.

Digital-signal recording and reproducing apparatuses conforming to the D-VHS (trademark) standards are designed so that they can also implement analog VHS (trademark) recording and playback. To implement analog VHS recording and playback in addition to D-VHS recording and playback, a rotary drum in the D-VHS apparatus has an increased number of rotary heads.

A conceivable rotary head drum device which is not prior art against this invention has an increased number of high-performance rotary heads on a rotary drum. Since the high-performance rotary heads are expensive, the conceivable rotary head drum device is high in cost. Using inexpensive rotary heads instead of the high-performance rotary heads causes poor operation characteristics of the conceivable device.

SUMMARY OF THE INVENTION

It is an object of this invention to provide a low-cost high-performance rotary head drum device.

A first aspect of this invention provides a rotary head drum device comprising a rotary drum rotating at a given speed, and a plurality of rotary heads mounted on the rotary drum for scanning a magnetic tape fed in a given direction and wrapped on an outer circumferential surface of the rotary drum in a predetermined angular range along a part of helix, the rotary heads recording an information signal on the magnetic tape while forming recording tracks in a guard-band-less structure on the magnetic tape during recording, the rotary heads reproducing the information signal from the recording tracks on the magnetic tape during playback. The rotary heads comprise first and second rotary heads for a low-frequency-range information signal, the first and second rotary heads being opposed to each other diametrically with respect to the rotary drum and being different from each other in azimuth angle; a third rotary head for digital signals in frequency ranges higher than a frequency range of the low-frequency-range information signal, and for first and second operation modes being different from each other in data transmission rate; a fourth rotary head for a digital signal in the second operation mode, the fourth rotary head being opposed to the third rotary head diametrically with respect to the rotary drum and being equal in azimuth angle to the third rotary head; a fifth rotary head for a digital signal in the first operation mode, the fifth rotary head being substantially opposed to the third rotary head diametrically with respect to the rotary drum and being different from the third rotary head in azimuth angle, the fourth and fifth rotary heads being in a double azimuth head structure; and sixth and seventh rotary heads for a digital signal in the second operation mode, the sixth and seventh rotary heads being opposed to each other diametrically with respect to the rotary drum and being equal to each other in azimuth angle.

A second aspect of this invention is based on the first aspect thereof, and provides a rotary head drum device wherein the first, third, and fourth rotary heads are equal to each other in azimuth angle, wherein the second, fifth, sixth, and seventh rotary heads are equal to each other in azimuth angle, and wherein scanning trajectories formed by the third and sixth rotary heads and corresponding to two adjacent parallel tracks, and scanning trajectories formed by the fourth and seventh rotary heads and corresponding to two adjacent parallel tracks alternately occur during the second operation mode.

A third aspect of this invention provides a rotary head drum device comprising a rotary drum; first and second rotary heads provided on the rotary drum and opposed to each other diametrically with respect to the rotary drum, the first and second rotary heads being different from each other in azimuth angle and having frequency response characteristics suited for an information signal in a given frequency range; a third rotary head provided on the rotary drum and having a frequency response characteristic suited for a digital signal in a frequency range higher than the frequency range of the information signal; a fourth rotary head provided on the rotary drum and opposed to the third rotary head diametrically with respect to the rotary drum, the fourth rotary head being equal in azimuth angle to the third rotary head and having a frequency response characteristic suited for a digital signal in a frequency range higher than the frequency range of the information signal; a fifth rotary head provided on the rotary drum and substantially opposed to the third rotary head diametrically with respect to the rotary drum, the fifth rotary head being different from the third rotary head in azimuth angle and having a frequency response characteristic suited for a digital signal in a frequency range higher than the frequency range of the information signal, the fourth and fifth rotary heads being in a double azimuth head structure; and sixth and seventh rotary heads provided on the rotary drum and opposed to each other diametrically with respect to the rotary drum, the sixth and seventh rotary heads being equal to each other in azimuth angle and having frequency response characteristics suited for a digital signal in a frequency range higher than the frequency range of the information signal.

A fourth aspect of this invention is based on the third aspect thereof, and provides a rotary head drum device wherein the first, third, and fourth rotary heads are equal to each other in azimuth angle, and wherein the second, fifth, sixth, and seventh rotary heads are equal to each other in azimuth angle.

A fifth aspect of this invention is based on the third aspect thereof, and provides a rotary head drum device wherein the third and sixth rotary heads form scanning trajectories corresponding to two adjacent parallel tracks, and the fourth and seventh rotary heads form scanning trajectories corresponding to two adjacent parallel tracks.

BRIEF DESCRIPTION OF THE DRAWINGS

FIG. 6 is a diagram of a track pattern on a magnetic tape.

DESCRIPTION OF THE PREFERRED EMBODIMENT

A conceivable rotary head drum device which is not prior art against this invention will be explained below for a better understanding of this invention.

Figure 1:
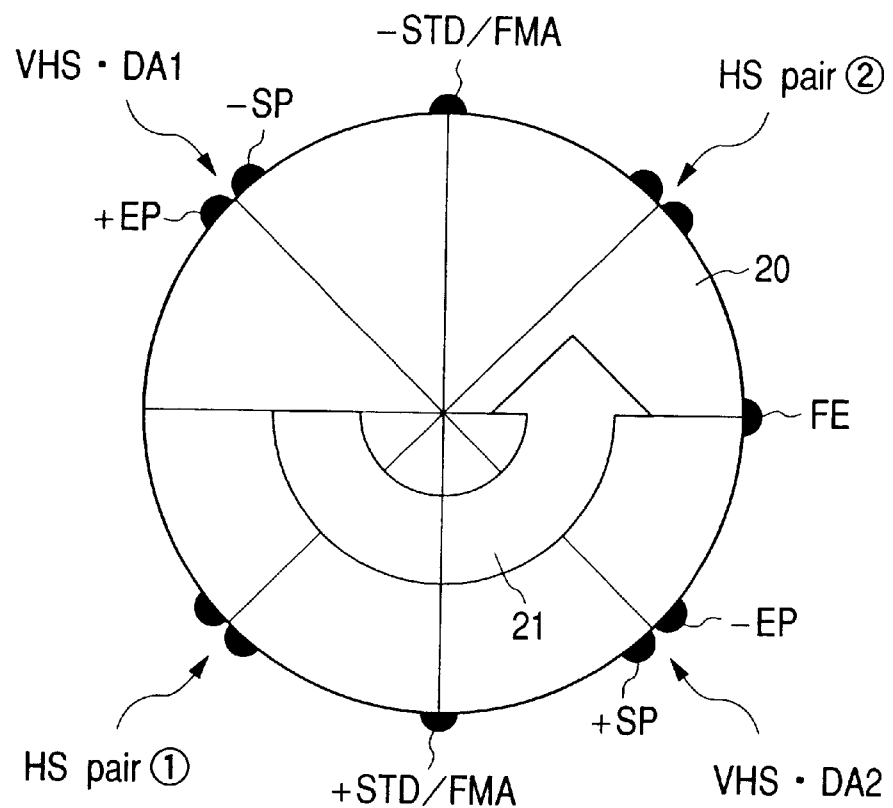
FIG. 1 is a diagram of a conceivable rotary head drum device which is not prior art against this invention.

FIG. 1 shows a conceivable rotary head drum device for a D-VHS recording and reproducing apparatus which is not prior art against this invention. The conceivable rotary head drum device in FIG. 1 includes a rotary drum 20. The rotary drum 20 is rotated about its axis at a given speed in a direction denoted by the arrow 21. The rotary drum 20 has a plurality of rotary heads.

Specifically, first and second video/audio recording and reproducing heads +STD/FMA and −STD/FMA are provided on the outer circumferential surface (the rotational surface) of the rotary drum 20. The heads +STD/FMA and −STD/FMA are opposed to each other diametrically with respect to the rotary drum 20. The heads +STD/FMA and −STD/FMA are mounted on the rotary drum 20 by suitable supports, and are located slightly outward of the outer circumferential surface of the rotary drum 20.

First and second VHS double azimuth heads VHS.DA1 and VHS.DA2 are provided on the outer circumferential surface (the rotational surface) of the rotary drum 20. The heads VHS.DA1 and VHS.DA2 are opposed to each other diametrically with respect to the rotary drum 20. The heads VHS.DA1 and VHS.DA2 are mounted on the rotary drum 20 by suitable supports, and are located slightly outward of the outer circumferential surface of the rotary drum 20.

First and second pair heads HSpair① and HSpair② for a D-VHS HS mode (a D-VHS high speed mode) are provided on the outer circumferential surface (the rotational surface) of the rotary drum 20. The heads HSpair① and HSpair② are opposed to each other diametrically with respect to the rotary drum 20. The heads HSpair① and HSpair② are mounted on the rotary drum 20 by suitable supports, and are located slightly outward of the outer circumferential surface of the rotary drum 20.

A flying erase head FE is provided on the outer circumferential surface (the rotational surface) of the rotary drum 20. The head FE is mounted on the rotary drum 20 by a suitable support, and is located slightly outward of the outer circumferential surface of the rotary drum 20.

As shown in FIG. 1, the first VHS double azimuth head VHS.DA1, the first pair head HSpair①, the first video/audio recording and reproducing head +STD/FMA, the second VHS double azimuth head VHS.DA2, the flying erase head FE, the second pair head HSpair②, and the second video/audio recording and reproducing head −STD/FMA are sequentially arranged in that order along the circumference of the rotary drum 20. The first pair head HSpair① is spaced from the first VHS double azimuth head VHS.DA1 by an angular interval of about 90°. The first pair head HSpair①, the first video/audio recording and reproducing head +STD/FMA, the second VHS double azimuth head VHS.DA2, the flying erase head FE, the second pair head HSpair②, and the second video/audio recording and reproducing head −STD/FMA are spaced at angular intervals of about 45°.

Figure 2:
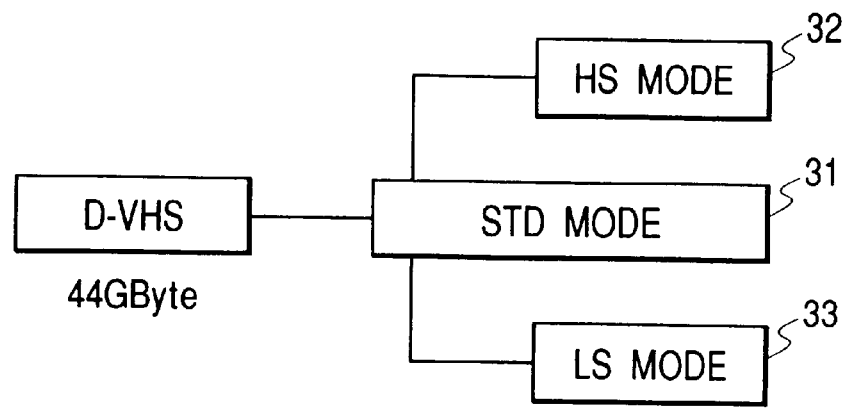
FIG. 2 is a diagram of modes of operation of a D-VHS recording and reproducing apparatus.

As shown in FIG. 2, operation of a D-VHS recording and reproducing apparatus can be changed among a standard-speed mode (an STD mode) 31, a high-speed mode (an HS mode) 32, and a low-speed mode (an LS mode) 33. The STD mode 31 provides a standard data transmission rate. The HS mode 32 provides a high data transmission rate greater than the standard data transmission rate. The LS mode 33 provides a low data transmission rate smaller than the standard data transmission rate.

During the execution of the STD mode 31 of recording operation, a magnetic tape is fed at a speed of 16.67 mm/s which is the same as that in an LP mode of a VHS system, and main data are recorded on the magnetic tape at a transmission rate of 14.1 Mbps while a track pattern is formed on the magnetic tape. In this case, the track pattern has a track pitch of 29 μm.

During the execution of the HS mode 32 of recording operation, a magnetic tape is fed at a speed of 33.35 mm/s which is the same as that in an SP mode of a VHS system, and main data are recorded on the magnetic tape at a transmission rate of 28.2 Mbps while a track pattern is formed on the magnetic tape. In this case, a pair of adjacent parallel tracks are simultaneously formed, and the resultant track pattern has a track pitch of 29 μm.

The LS mode 33 can be changed among sub-modes LS2, LS3, LS5, and LS7. During the execution of the sub-mode LS2 of recording operation, a magnetic tape is fed at a speed equal to a half of the speed provided in the STD mode 31, and main data are recorded on the magnetic tape at a transmission rate of 7.0 Mbps while a track pattern is formed on the magnetic tape. Specifically, the recording of main data on the magnetic tape is implemented once for every two revolutions of the rotary drum 20. In this case, the track pattern has a track pitch of 29 μm. The sub-modes LS3, LS5, and LS7 provide tape feed speeds equal to one third, one fifth, and one seventh of the speed in the STD mode 31, respectively.

With reference back to FIG. 1, the rotary heads +STD/FMA and −STD/FMA are used during the STD mode 31 of operation. Also, the rotary heads +STD/FMA and −STD/FMA are used in recording and reproducing a frequency-modulated VHS audio signal on and from the magnetic tape. The rotary heads +STD/FMA and −STD/FMA are different from each other in azimuth angle.

The rotary head (the double azimuth head) VHS.DA1 has a pair of adjacent sub-heads +EP and −SP which are different from each other in azimuth angle. The sub-head +EP is used during the EP mode of operation of the VHS system. On the other hand, the sub-head −SP is used during the SP mode of operation of the VHS system.

The rotary head (the double azimuth head) VHS.DA2 has a pair of adjacent sub-heads −EP and +SP which are different from each other in azimuth angle. The sub-head −EP is used during the EP mode of operation of the VHS system. On the other hand, the sub-head +SP is used during the SP mode of operation of the VHS system.

The rotary head (the pair head) HSpair① has a pair of adjacent sub-heads. Also, the rotary head (the pair head) HSpair② has a pair of adjacent sub-heads. A pair of adjacent parallel tracks are simultaneously formed on the magnetic tape by the rotary head HSpair① or the rotary head HSpair② during the HS mode 32 of recording operation.

The conceivable rotary head drum device in FIG. 1 is able to implement recording and playback in the HS mode and the STD mode of operation of the D-VHS system in addition to recording and playback in the VHS system.

In the conceivable rotary head drum device of FIG. 1, the rotary heads +STD/FMA and −STD/FMA are used during the STD mode 31 of operation for recording and reproducing a high-frequency-range D-VHS digital signal or a wide-band D-VHS digital signal having a relatively high maximum frequency. Also, the rotary heads +STD/FMA and −STD/FMA are used to record and reproduce a frequency-modulated VHS audio signal which is in the range of low frequencies. Accordingly, the frequency responses of the rotary heads +STD/FMA and −STD/FMA are chosen to cover a wide frequency band including low frequencies of an frequency-modulated VHS audio signal and high frequencies of a D-VHS digital signal.

It is thinkable that such a wide-band rotary head uses a high-performance head, for example, a MIG (metal in gap) head or a laminated head. Since the high-performance head is expensive, the conceivable rotary head drum device in FIG. 1 which uses the high-performance heads is high in cost.

It is difficult for inexpensive heads such as ferrite heads to have sufficient wide-band response characteristics. Therefore, the conceivable rotary head drum device in FIG. 1 which uses the inexpensive heads is poor in operation performances.

Embodiment

Figure 3:
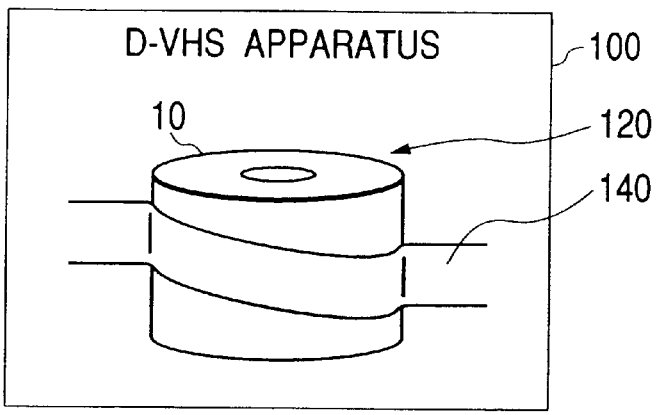
FIG. 3 is a diagram of a D-VHS recording and reproducing apparatus including a rotary head drum device according to an embodiment of this invention.

In the following description, "D-VHS" and "VHS" are trademarks. With reference to FIG. 3, a D-VHS recording and reproducing apparatus 100 includes a rotary head drum device 120 according to an embodiment of this invention. The rotary head drum device 120 has a rotary drum 10. A motor (not shown) rotates the rotary drum 10 about its axis. A magnetic tape (a recording medium) 140 is wrapped on the outer circumferential surface of the rotary drum 10 in an angular range of about 180° along a part of helix. A tape drive mechanism (not shown) feeds the magnetic tape 140 relative to the rotary drum 10 in a given direction.

The apparatus 100 operates in any one of different modes including a D-VHS STD mode (a D-VHS standard mode), a D-VHS HS mode (a D-VHS high speed mode), a VHS SP mode (a VHS standard play mode), and a VHS EP mode (a VHS extended play mode). The D-VHS STD mode and the D-VHS HS mode are different from each other in data transmission rate. The apparatus 100 can implement either normal play or trick play during the D-VHS STD mode of operation. In addition, the apparatus 100 can implement either normal play or trick play during the D-VHS HS mode of operation.

Figure 4:
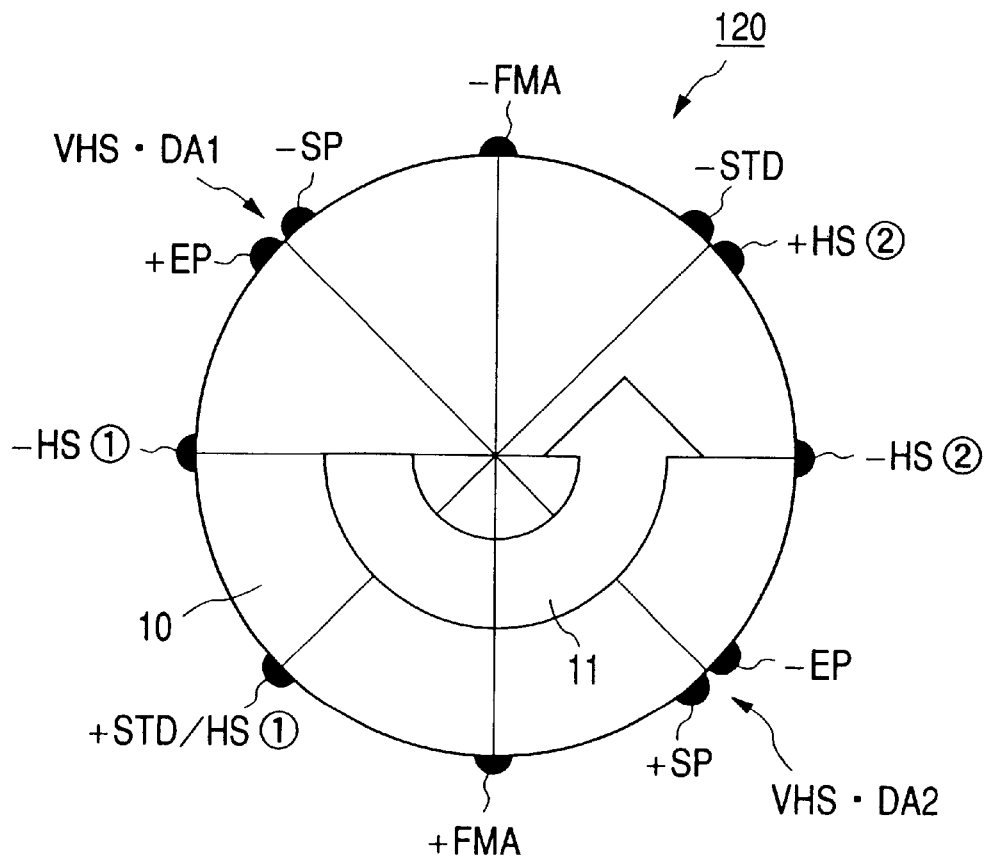
FIG. 4 is a diagram of the rotary head drum device in FIG. 3.

With reference to FIG. 4, the rotary drum 10 is rotated about its axis at a given speed in a direction denoted by the arrow 11. The rotary drum 10 has a plurality of rotary heads including seven heads +FMA, −FMA, −HS①, −HS②, +STD/HS①, −STD, and +HS②, and two double azimuth heads VHS.DA1 and VHS.DA2. Specifically, the rotary heads +FMA, −FMA, −HS①, −HS②, +STD/HS①, −STD, +HS②, VHS.DA1, and VHS.DA2 are provided on the outer circumferential surface (the rotational surface) of the rotary drum 10. The rotary heads +FMA, −FMA, −HS①, −HS②, +STD/HS①, −STD, +HS②, VHS.DA1, and VHS.DA2 are mounted on the rotary drum 10 by suitable supports, and are located slightly outward of the outer circumferential surface of the rotary drum 10. Preferably, the rotary heads +FMA, +STD/HS①, −HS①, VHS.DA1, −FMA, −STD, +HS②, −HS②, and VHS.DA2 are circumferentially arranged and spaced in that order at angular intervals of about 45°.

The rotary heads +FMA and −FMA are opposed to each other diametrically with respect to the rotary drum 10. The rotary heads +FMA and −FMA are designed to record and reproduce a frequency-modulated VHS audio signal on and from the magnetic tape 140. Accordingly, the rotary heads +FMA and −FMA have frequency response characteristics suited for a frequency-modulated VHS audio signal. The rotary head +FMA has an azimuth angle of +30°. The rotary head −FMA has an azimuth angle of −30°.

The rotary heads −HS② and −HS① are opposed to each other diametrically with respect to the rotary drum 10. The rotary heads −HS② and −HS① precede the rotary heads +FMA and −FMA by angles of 90° in the direction 11 of rotation of the rotary drum 10, respectively. The rotary heads −HS② and −HS① are alternately used during the D-VHS HS mode of operation of the apparatus 100. Accordingly, the rotary heads −HS② and −HS① have frequency response characteristics suited for a D-VHS digital signal in a frequency range higher than a frequency range of a VHS information signal. The rotary heads −HS② and −HS① have an azimuth angle of −30°.

The double azimuth heads VHS.DA1 and VHS.DA2 are opposed to each other diametrically with respect to the rotary drum 10. The double azimuth heads VHS.DA1 and VHS.DA2 precede the rotary heads −FMA and +FMA by angles of about 45° in the direction 11 of rotation of the rotary drum 10, respectively.

The double azimuth head VHS.DA1 has a pair of adjacent rotary sub-heads −SP and +EP. The sub-head −SP is used in recording and reproducing a video signal during the VHS SP mode of operation of the apparatus 100. The sub-head −SP has an azimuth angle of −6°. The sub-head +EP is used in recording and reproducing a video signal during the VHS EP mode of operation of the apparatus 100. The sub-head +EP has an azimuth angle of +6°. The double azimuth head VHS.DA1 has frequency response characteristics suited for a VHS information signal.

The double azimuth head VHS.DA2 has a pair of adjacent rotary sub-heads +SP and −EP. The sub-head +SP is used in recording and reproducing a video signal during the VHS SP mode of operation of the apparatus 100. The sub-head +SP has an azimuth angle of +6°. The sub-head +SP is diametrically opposed to the sub-head −SP. The sub-head −EP is used in recording and reproducing a video signal during the VHS EP mode of operation of the apparatus 100. The sub-head −EP has an azimuth angle of −6°. The sub-head −EP is diametrically opposed to the sub-head +EP. The double azimuth head VHS.DA2 has frequency response characteristics suited for a VHS information signal.

The rotary head +STD/HS① is located between the rotary head −HS① and the rotary head +FMA. The rotary head +STD/HS① is used during the D-VHS STD mode of operation of the apparatus 100, and also during the D-VHS HS mode of operation thereof. Accordingly, the rotary head +STD/HS① has frequency response characteristics suited for D-VHS digital signals in frequency ranges higher than a frequency range of a VHS information signal. The rotary head +STD/HS① has an azimuth angle of +30°. Since the rotary head +STD/HS① is used during only the D-VHS STD mode and the D-VHS HS mode of operation of the apparatus 100, it is sufficient that the rotary head +STD/HS① has narrower-band response characteristics in comparison with the conceivable heads +STD/FMA and −STD/FMA (see FIG. 1). Therefore, the rotary head +STD/HS① can be inexpensive. The height of the rotary head +STD/HS① relative to the rotary head −HS① is chosen so that a pair of adjacent parallel tracks will be simultaneously formed or simultaneously scanned by the rotary head +STD/HS① and the rotary head −HS①.

The rotary head −STD is located between the rotary head −HS② and the rotary head −FMA. The rotary head −STD is used during the D-VHS STD mode of operation of the apparatus 100. Accordingly, the rotary head −STD has frequency response characteristics suited for a D-VHS digital signal in a frequency range higher than a frequency range of a VHS information signal. The rotary head −STD has an azimuth angle of −30°. The rotary head −STD is substantially diametrically opposed to the rotary head +STD/HS①.

The rotary head +HS② is adjacent to the rotary head −STD.

The rotary head +HS② is used in the D-VHS HS mode of operation of the apparatus 100. Accordingly, the rotary head +HS② has frequency response characteristics suited for a D-VHS digital signal in a frequency range higher than a frequency range of a VHS information signal. The rotary head +HS② has an azimuth angle of +30°. The rotary head +HS② is diametrically opposed to the rotary head +STD/HS①.

As previously mentioned, the rotary head −STD is used during the D-VHS STD mode of operation of the apparatus 100. The rotary head +HS② is used in the D-VHS HS mode of operation of the apparatus 100. Therefore, the rotary heads −STD and +HS② are free from an inter-head crosstalk problem so that the interval between the gaps thereof can be small. Thus, the rotary heads −STD and +HS② can be of a double azimuth structure in which two head core chips are retained by one common support. The height of the rotary head +HS② relative to the rotary head −HS② is chosen so that a pair of adjacent parallel tracks will be simultaneously formed or simultaneously scanned by the rotary head +HS② and the rotary head −HS②.

It is sufficient that all of the rotary heads +FMA, −FMA, −HS①, −HS②, +STD/HS①, −STD, +HS②, VHS.DA1, and VHS.DA2 have narrower-band response characteristics in comparison with the conceivable heads +STD/FMA and −STD/FMA (see FIG. 1). Therefore, all of the rotary heads +FMA, −FMA, −HS①, −HS②, +STD/HS①, −STD, +HS②, VHS.DA1, and VHS.DA2 use inexpensive heads such as ferrite heads. Thus, the rotary head drum device 120 can be low in cost.

The rotary head drum device 120 enables both normal play and trick play to be satisfactorily implemented in the D-VHS STD mode and the D-VHS HS mode of operation of the apparatus 100.

Figure 5:
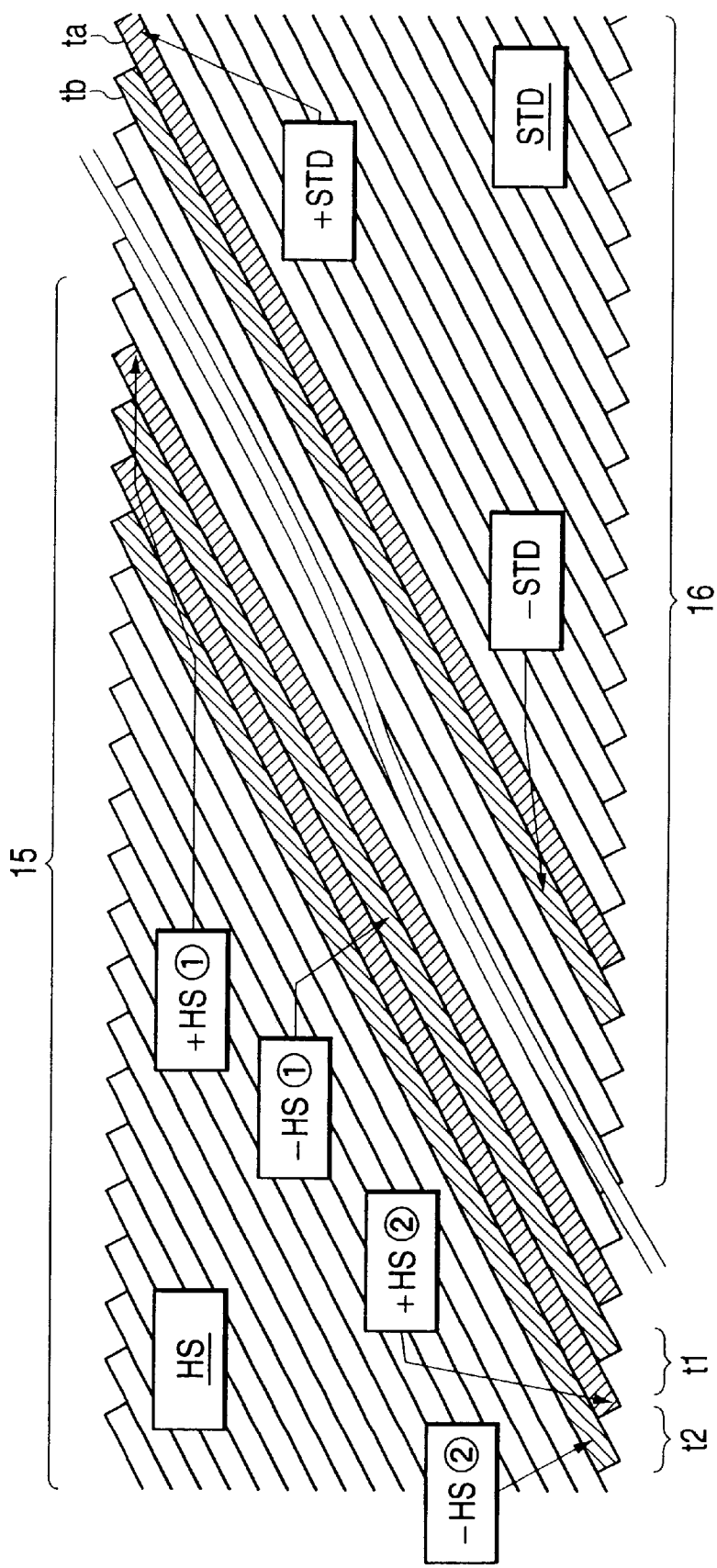
FIG. 5 is a diagram of a track pattern on a magnetic tape.

Specifically, during normal play in the D-VHS HS mode of operation of the apparatus 100, tracks on the magnetic tape 140 are scanned as follows. With reference to a track pattern region 15 in FIG. 5, a pair t1 of adjacent parallel tracks are simultaneously scanned by the rotary heads +HS① (+STD/HS①) and −HS① for the first half of revolution of the rotary drum 10, and a pair t2 of adjacent parallel tracks are simultaneously scanned by the rotary heads +HS② and −HS② for the second half of revolution of the rotary drum 10.

During normal play in the D-VHS STD mode of operation of the apparatus 100, tracks on the magnetic tape 140 are scanned as follows. With reference to a track pattern region 16 in FIG. 5, a track "ta" is scanned by the rotary head +STD/HS① for the first half of revolution of the rotary drum 10, and a track "tb" neighboring the track "ta" is scanned by the rotary head −STD for the second half of revolution of the rotary drum 10.

Trick play can be changed among different types including a type corresponding to a forward-direction 8-fold speed and a type corresponding to a forward-direction 6-fold speed.

With reference to a track pattern region 18 in FIG. 6, during the forward-direction 4-fold speed trick play in the D-VHS HS mode of operation, the rotary head +HS① (+STD/HS①) scans the magnetic tape 140 along a trajectory t11 before the rotary head +HS② scans the magnetic tape 140 along a trajectory t12. Each of the scanning trajectories t11 and t12 crosses obliquely a plurality of tracks.

With reference to a track pattern region 19 in FIG. 6, during the forward-direction 8-fold speed trick play in the D-VHS STD mode of operation, the rotary head +STD/HS① scans the magnetic tape 140 along a trajectory "tc" before the rotary head −STD scans the magnetic tape 140 along a trajectory "td". Each of the scanning trajectories "tc" and "td" crosses obliquely a plurality of tracks. During the forward-direction 8-fold speed trick play in the D-VHS STD mode of operation, the magnetic tape 140 is scanned alternately by the two actively-used rotary heads, that is, the rotary heads +STD/HS① and −STD, which are different from each other in azimuth angle.

During the forward-direction 3-fold speed trick play in the D-VHS HS mode of operation or the forward-direction 6-fold speed trick play in the D-VHS STD mode of operation, each scanning trajectory formed by an actively-used rotary head crosses five tracks.

What is claimed is:

1. A rotary head drum device comprising a rotary drum rotating at a given speed, and a plurality of rotary heads mounted on the rotary drum for scanning a magnetic tape fed in a given direction and wrapped on an outer circumferential surface of the rotary drum in a predetermined angular range along a part of helix, the rotary heads recording an information signal on the magnetic tape while forming recording tracks in a guard-band-less structure on the magnetic tape during recording, the rotary heads reproducing the information signal from the recording tracks on the magnetic tape during playback, wherein the rotary heads comprise:

first and second rotary heads for a low-frequency-range information signal, the first and second rotary heads being opposed to each other diametrically with respect to the rotary drum and being different from each other in azimuth angle;

a third rotary head for digital signals in frequency ranges higher than a frequency range of the low-frequency-range information signal, and for first and second operation modes being different from each other in data transmission rate;

a fourth rotary head for a digital signal in the second operation mode, the fourth rotary head being opposed to the third rotary head diametrically with respect to the rotary drum and being equal in azimuth angle to the third rotary head;

a fifth rotary head for a digital signal in the first operation mode, the fifth rotary head being substantially opposed to the third rotary head diametrically with respect to the rotary drum and being different from the third rotary head in azimuth angle, the fourth and fifth rotary heads being in a double azimuth head structure; and sixth and seventh rotary heads for a digital signal in the second operation mode, the sixth and seventh rotary heads being opposed to each other diametrically with respect to the rotary drum and being equal to each other in azimuth angle.

2. A rotary head drum device as recited in claim 1, wherein the first, third, and fourth rotary heads are equal to each other in azimuth angle, wherein the second, fifth, sixth, and seventh rotary heads are equal to each other in azimuth angle, and wherein scanning trajectories formed by the third and sixth rotary heads and corresponding to two adjacent parallel tracks, and scanning trajectories formed by the fourth and seventh rotary heads and corresponding to two adjacent parallel tracks alternately occur during the second operation mode.

3. A rotary head drum device comprising:

a rotary drum;

first and second rotary heads provided on the rotary drum and opposed to each other diametrically with respect to the rotary drum, the first and second rotary heads being different from each other in azimuth angle and having frequency response characteristics suited for an information signal in a given frequency range;

a third rotary head provided on the rotary drum and having a frequency response characteristic suited for a digital signal in a frequency range higher than the frequency range of the information signal;

a fourth rotary head provided on the rotary drum and opposed to the third rotary head diametrically with respect to the rotary drum, the fourth rotary head being equal in azimuth angle to the third rotary head and having a frequency response characteristic suited for a digital signal in a frequency range higher than the frequency range of the information signal;

a fifth rotary head provided on the rotary drum and substantially opposed to the third rotary head diametrically with respect to the rotary drum, the fifth rotary head being different from the third rotary head in azimuth angle and having a frequency response characteristic suited for a digital signal in a frequency range higher than the frequency range of the information signal, the fourth and fifth rotary heads being in a double azimuth head structure; and sixth and seventh rotary heads provided on the rotary drum and opposed to each other diametrically with respect to the rotary drum, the sixth and seventh rotary heads being equal to each other in azimuth angle and having frequency response characteristics suited for a digital signal in a frequency range higher than the frequency range of the information signal.

4. A rotary head drum device as recited in claim 3, wherein the first, third, and fourth rotary heads are equal to each other in azimuth angle, and wherein the second, fifth, sixth, and seventh rotary heads are equal to each other in azimuth angle.

5. A rotary head drum device as recited in claim 3, wherein the third and sixth rotary heads form scanning trajectories corresponding to two adjacent parallel tracks, and the fourth and seventh rotary heads form scanning trajectories corresponding to two adjacent parallel tracks.

* * * * *